(No Model.)

G. F. PUTMAN.
VEHICLE SPRING.

No. 281,728. Patented July 24, 1883.

Witnesses.
C. J. Mattison.
J. W. Larchar

Inventor.
Geo. F. Putman, by
William H. Low,

Attorney

UNITED STATES PATENT OFFICE.

GEORGE F. PUTMAN, OF FONDA, NEW YORK.

VEHICLE-SPRING.

SPECIFICATION forming part of Letters Patent No. 281,728, dated July 24, 1883.

Application filed April 1, 1882. (No model.)

*To all whom it may concern:*

Be it known that I, GEORGE F. PUTMAN, of Fonda, in the county of Montgomery and State of New York, have invented certain new and useful Improvements in Wagon-Springs, of which the following is a full and exact description, reference being had to the accompanying drawings, which form part of this specification, and in which—

Figure 1:
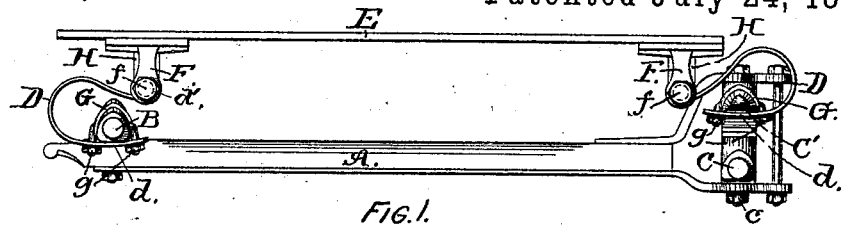
Figure 2:
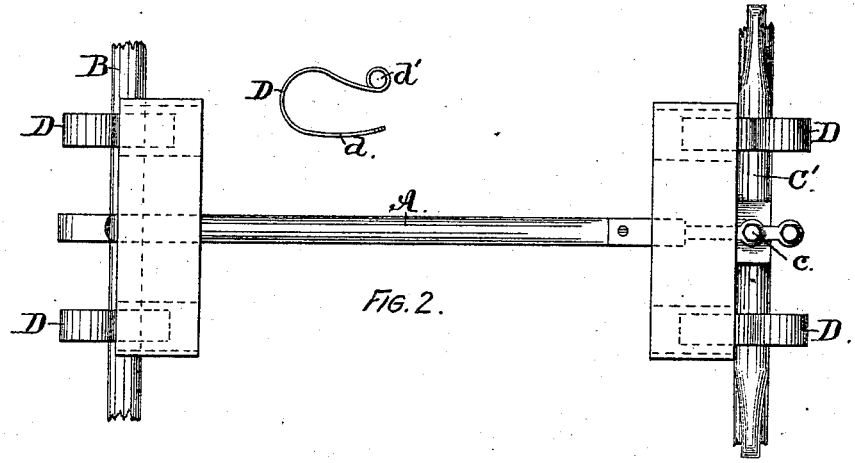
Figure 3:
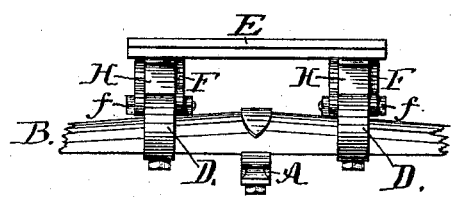

Figure 1 is a side elevation of the parts of a wagon containing my improvements; Fig. 2, a plan view of the same, and Fig. 3 a rear elevation of the hind axle.

My invention relates to improvements in springs for wagons and other vehicles; and it consists in forming said springs in the manner herein shown and described, and in the mode herein set forth of attaching the said springs to the running-gear and body.

The object of my invention is to provide cheap, reliable, and noiseless springs for wagons and other similar vehicles.

As illustrated in the drawings, A represents the reach of the wagon; B, the hind axle; C, the front axle; C', the head-block, to which the reach A is pivoted by means of the king-bolt c; D, the springs; E, the platform or bottom of the wagon-box, and F the couplings or shackles for attaching the body of the wagon to the springs.

The springs D are made of a crane-neck form, as shown in Fig. 1, and the lower end, d, of each is nearly straight, and is adapted to fit the under side of the hind axle, B, or head-block C', according to the place whereto it is required to be attached; and the said springs are secured in their places by means of clips G, which fit over the upper side of the axle B or head-block C', and are provided with screw-threaded end pieces, which pass through suitable holes formed for that purpose in the ends d of spring, and which screw-threaded end pieces are provided with the screw-nuts g, the whole forming a secure clamping device for fastening the springs D to their proper places. The upper part of each spring extends upward and bends over the axle or head-block, as shown in Fig. 1, and terminates in a sleeve, d', which passes between the side pieces of the shackle F, to which the spring is connected by means of a transverse screw-bolt, f, that passes through the sleeve d' and the eyes formed in the lower end of the side pieces of the shackle. An elastic block or cushion, H, made of india-rubber or other suitable elastic material, is interposed between the sleeve d' and the upper plate of the shackle F, and thereby the sleeve d' is kept in constant contact with the bolt f in such manner as to destroy any tendency of those parts to produce a rattling noise, and the said elastic cushions also aid the springs D in giving an elastic support to the body of the vehicle.

It is obvious that the shackles F may be readily attached to a platform, box-bottom, side bars, or any other of the well-known devices for carrying the body of a wagon or other vehicle.

I claim as my invention—

The combination of a wagon-reach, A, and axles B, attached thereto, and platform E, with the shackles F, attached to the under side of said platform, the springs D, each of which is bent into crane form, with its upper end farther in than its lower end, said upper end being attached to one of said shackles, and lower end to one of said axles, and the rubber pad H, interposed between said spring and the upper plate of said shackle, to prevent rattling, substantially as set forth.

GEORGE F. PUTMAN.

Witnesses:
JAY FISHER,
B. H. DOCKSTADER.